July 13, 1937.  J. GAWILER  2,086,612

POULTRY APPLIANCE

Filed Jan. 22, 1932

Inventor

John Gawiler

By Clarence A. O'Brien
Attorney

Patented July 13, 1937

2,086,612

UNITED STATES PATENT OFFICE 2,086,612

POULTRY APPLIANCE

John Gawiler, Toppenish, Wash.

Application January 22, 1932, Serial No. 588,213

4 Claims. (Cl. 119—143)

This invention relates to a device to protect the vent of a hen while laying an egg.

As is well known in the art, at the time a hen is passing an egg the vent is dilated in order that the egg can pass through the opening and be deposited in the nest. Other hens and chickens upon seeing the vent being dilated are attracted by the red lining of the vent and are wont to peck at the vent. This produces a sore and the next egg passed is passed through a sore or diseased vent. This latter is painful and sometimes the egg is smeared with blood. A great loss of laying hens is caused by the practice or tendency of chickens to peck the vent.

In accordance with the present invention a device is provided which may be readily attached to the hen, being more particularly attached to the rump. When so positioned the vent protector, upon dilation of the vent, is raised sufficiently from the body to permit the egg to be passed, the protector being normally pressed against the vent sufficiently to protect it from the ravages of the other chickens.

Further, in accordance with the present invention, the protector may also serve as an identifying device such as is used for identifying the laying hens and in making a record of their egg production.

The invention together with its numerous other objects and advantages will be best understood from a study of the following description, taken in connection with the accompanying drawing, wherein:—

Figure 1:
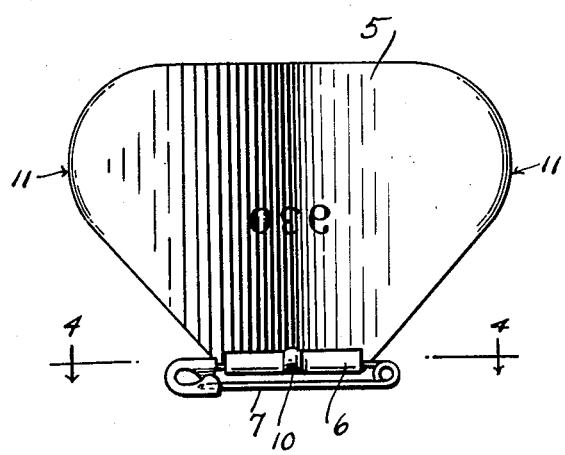
Figure 1 is a plan view of the device.
Figure 2:
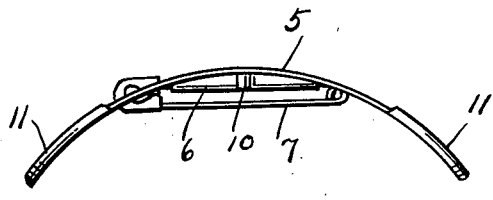
Figure 2 is an edge elevational view thereof.
Figure 3:
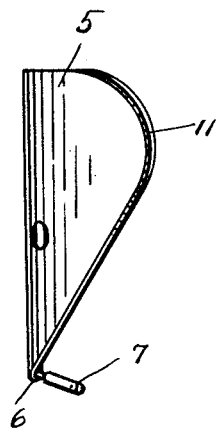
Figure 3 is a side elevational view thereof.
Figure 4:
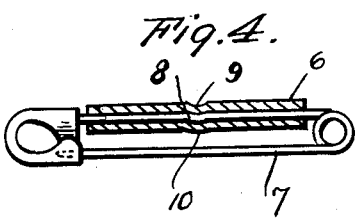
Figure 4 is a sectional view taken substantially on the line 4—4 of Figure 1.

With reference more in detail to the drawing, it will be seen that my vent protector comprises a plate-like body 5 which is preferably of metal, but which may be made of any suitable material. Preferably the plate-like body 5 in its configuration is in the form of a triangle and is curved as shown. The plate 5 has one truncated apex and at this apex the material of the plate is rolled upon itself to provide a transverse sleeve 6. Suitably connected with this sleeve is any suitable fastening element, the latter in the present instance being shown as a well known type of safety pin 7 the fixed side of which extends through the sleeve 6 and is laterally offset intermediate its ends as at 8, and at the point 8 is engaged by an internal protuberance 9 serving to retain the part 8 in a recess 10, the protuberance 9 and recess 10 being formed on relatively opposite sides of the sleeve 6 by pressing the sleeve as clearly suggested in Fig. 4. The pin is thus held against longitudinal displacement relative to the plate.

At its opposite corners or apices, the plate 5 is rounded and is provided with flanges as at 11, presenting rounded faces at the concave side of the plate body.

It will thus be seen, that the shape of the device is such as to permit the protector to somewhat conformably fit the rear end of the hen.

As before intimated, in use, the protector is attached to the body of the hen by penetration of the rump by the pin 7 about one and one-half inches above the vent. So applied the plate-like body 5 will extend over the vent and provide a closure and protector therefor. Through the medium of the means 8, 9 and 10 in Figure 4 the connection between the pin 7 and plate 5 is somewhat rigid so that at the time the vent is dilated and the tail extended the plate 5 will be influenced thereby, moving out of pressed engagement with the vent a distance sufficient to protect the vent from the pecking by other chickens, and at the same time leaving space sufficient for the egg to be passed. By so locating the protector and applying it to the body of the hen, the protector will in nowise prevent the usual body functions.

In trap-nesting laying hens, the hens are identified by numbers or other suitable indicia, and when making a record of the egg production it is necessary for the attendant to enter the trap-nest or enclosure and take the number of the hen in order to make proper record of her laying capacity. In order to identify the hen, according to certain practice, a narrow metal band is attached to and extends around one of the legs. The numbers on the band are rather small and invariably cover the entire convex surface of the band, necessitating the band to be turned around in order for the numbers to be read, and the light not always being the best, confusion and error often follow.

In order to overcome the objection to this present practice, and to adapt the vent protector as an identifying medium in addition to its intended function of protector, the plate 5 has stamped or otherwise formed thereon numbers in upside-down position and on the convex side of the plate, and to read these numbers on the plate it is necessary only for the attendant to turn the hen up and ascertain the particular number or numbers on the plate.

As is apparent, the plate can be easily removed and probably would be immediately after the laying season, although it may be permitted to remain on the hen, it being in nowise a hindrance to the hen nor will it cause harm.

Even though I have herein shown and described the preferred embodiment of the invention, it is to be understood that I do not wish to limit myself to the precise details, construction, combination and arrangement of parts as herein shown and described, it being further intended to in nowise restrict the invention beyond the requirements of the prior art and the scope of the appended claims.

What is claimed as new is:—

1. A vent protector for egg laying fowls comprising a vent shielding element and means for functionally suspending it with respect to the vent from a part of the body of the fowl.

2. A vent protector for hens comprising a rigid plate, and a fastening means at the top edge of the plate for suspending it from the rump of the hen in an operative position protectively overlying the vent.

3. A device as in claim 2 wherein the plate is curved to conform substantially to the protected portion of the body of the fowl to which it is applied.

4. A vent protector for egg laying hens comprising a plate, a fastening device in the form of a safety pin fixed rigidly to the top edge of the plate in a manner whereby the pin may be applied through the rump of the hen thereby to operatively suspend the plate over the vent; the said plate being longitudinally curved to conform to the adjacent body part of the hen and being adapted to swing outwardly for passage of an egg from the vent.

JOHN GAWILER.